March 17, 1931.   N. A. CHRISTENSEN   1,796,440
COMPRESSOR VALVE MECHANISM
Filed Jan. 20, 1928
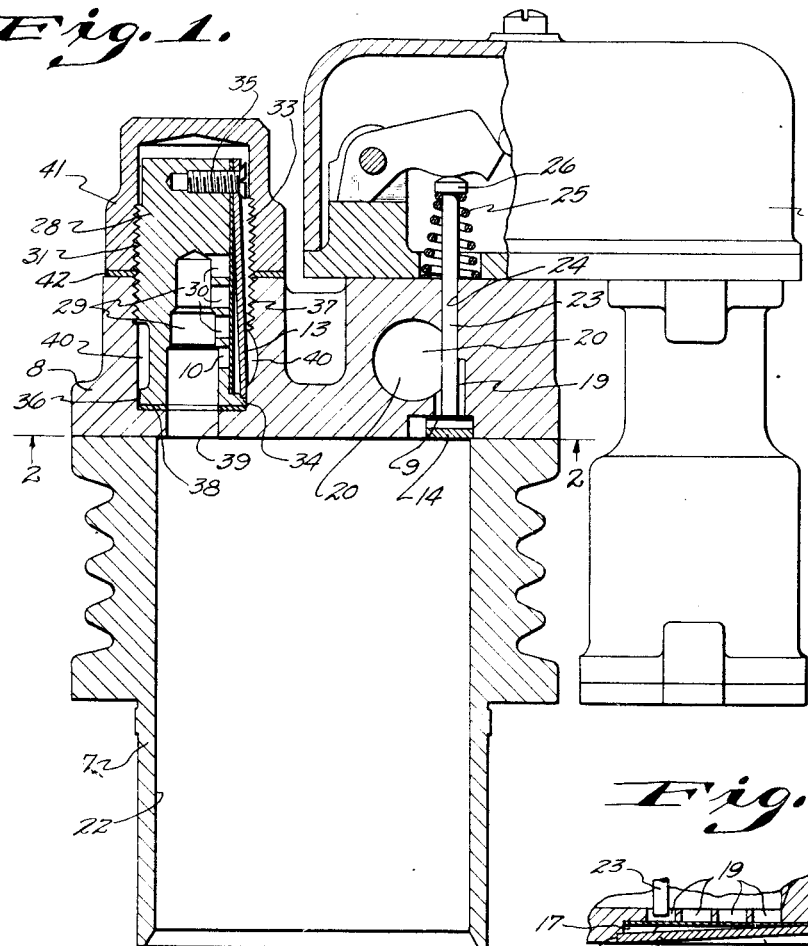
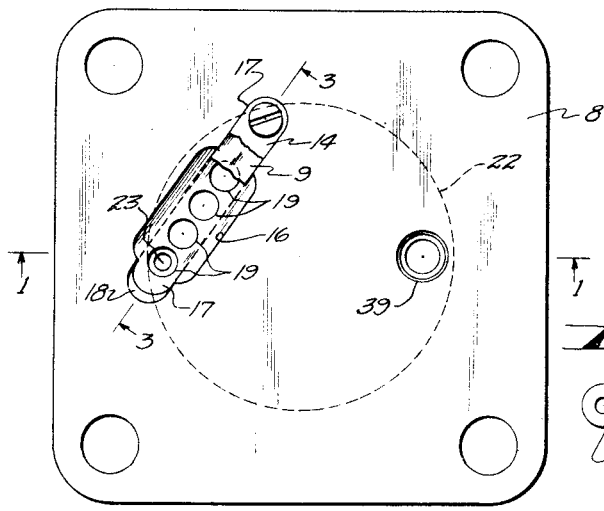
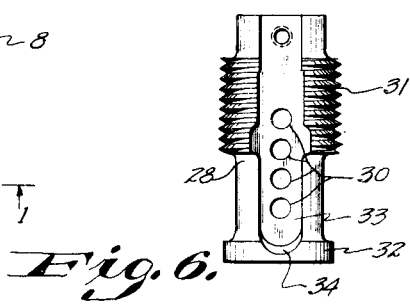
INVENTOR.
Niels A. Christensen
BY
Charles & French
ATTORNEYS Patented Mar. 17, 1931

1,796,440

UNITED STATES PATENT OFFICE

NIELS A. CHRISTENSEN, OF CLEVELAND, OHIO

COMPRESSOR-VALVE MECHANISM

Application filed January 20, 1928. Serial No. 248,140.

The invention relates to compressors and more particularly to the valve mechanism thereof.

The objects of the invention are to provide a novel form of spring leaf valve and its guard that may be used interchangeably for either inlet or discharge; to provide novel arrangements for mounting these valves in the compressor cylinder so that these valves or their guards cannot fall into the cylinder; to provide a novel form of discharge valve that may be readily removed from the cylinder; and to provide means for connecting the inlet valve with a suitable governor for holding the same open when the pressure in the system reaches a predetermined maximum value.

The invention further consists in the several features hereinafter set forth and more particularly defined by claims at the conclusion hereof.

In the drawings Fig. 1 is a vertical sectional view through a compressor equipped with valves embodying the invention and taken along the line 1—1 of Fig. 2;

Fig. 2 is a sectional view taken along the line 2—2 of Fig. 1, showing a bottom view of the head, parts being broken away;

Fig. 3 is a detail vertical sectional view taken on the line 3—3 of Fig. 2;

Fig. 4 is a side elevational view of the discharge valve cage;

Fig. 5 is a detail plan view of the interchangeable valve stop or guard;

Fig. 6 is a detail plan view of the interchangeable valve.

Referring to the drawings, the numeral 7 designates the cylinder barrel and 8 the cylinder head of an air or gas compressor, the head preferably being of the detachable type.

Both the inlet valve 9 and the discharge valve 10 consist of a thin flat spring steel strip 11 having curved ends and a hole 12 adjacent one end thereof, as shown in Fig. 6, said valves being interchangeable so as to permit ready manufacture and servicing.

The guards 13 and 14 for each of these valves are also interchangeable and serve as limiting stops. Each of these guards, as shown in Fig. 5, consists of a relatively thick metal strip 15 having curved ends and a hole 16 adjacent one end, and as shown in Figs. 1 and 3 are bent or inclined from said hole to permit the leaf valves with which they are respectively associated to be flexed away from the ports.

As shown in Figs. 1 and 2 the cylinder head 8 has a central flat-bottomed recess 16 and end recesses 17 and a stop recess 18 milled therein by a suitable milling cutter. The inlet valve 9 seats on the bottom of the recesses 17 at its ends and upon the central portion of the bottom of the recess 16 over the holes 19 which communicate with the inlet port 20 in the cylinder head leading to atmosphere. Both the valve 9 and the guard 14 are of less width than the recess 16 so that the air may enter the cylinder around said parts. The guard 14 has one end seated in one of the recesses 17 above the bottom of the head and the other or inclined end seats on the recess 18 and is substantially flush with the bottom of the head. A screw 21 passes through the holes 12 and 16 of this valve assembly into a threaded opening in the head and the valve parts thus described have their center line located in a chordal line relative to the bore 22 of the cylinder 7, as shown in Fig. 2, so that parts of the stop 14 and the attaching screw 21 lie outside of the cylinder bore and are thus disposed between the head and the top edge of the cylinder when in assembled position so that the stop or guard 14 and consequently the valve cannot fall into the cylinder if the valve should break or the screw 21 become loosened to any extent.

To govern the compressor, a push-rod 23 is slidably mounted in a bore 24 in the head and is normally held away from the valve by a spring 25 and has a head 26 upon which the governor 27 acts, said governor being of any suitable construction and serving to move said push-rod 23 downwardly when the pressure in the system, which the compressor supplies, reaches a predetermined maximum value to hold the inlet valve open to permit the compressor to run idle and to release the pressure on said rod to permit said compressor to function normally when the pressure in the system reaches a predetermined minimum value.

As shown in Figs. 1 and 4 the discharge valve 10 is associated with a cage member 28 consisting of a plug closed at its upper end and bored out at its lower end by a series of gradually decreasing bores 29 communicating with lateral discharge openings 30. The plug has a threaded portion 31 below its upper end, an annular flange 32 at its lower end, and a flat-bottomed slot 33 milled in its side having a curved lower end and a stop recess 34 at said end. The valve 10 seats on the flat bottom of the slot 33 over the openings 30 and together with its stop member 13 is secured to the cage by a screw 35 and the lower end of said member 13 seats in the stop recess 34 just clear of the bore 36 in the head. A portion of the threaded portion 31 is in threaded engagement with a threaded bore 37 in the head and the cage is screwed down against a gasket 38 seating on a flange surrounding a discharge opening 39 in the head while the discharge port 40, connected with the discharge line in any suitable manner, surrounds the cage, valve and guard between said threaded bore 37 and the flange 32 which engages the gasket. Thus all parts of the valve are on the outside of the cage and any leakage past the threaded connection between the head and the cage is prevented by a cap-nut 41 which is threaded to engage the exposed part of the threaded portion 31 and screws down upon a gasket 42 between its lower end and the head.

With the above construction valves may be cheaply manufactured and readily serviced, need no grinding, and it has been found give efficient and enduring service on compressors operating under very severe conditions, such as the compressors used on automotive vehicles for supplying compressed air to the brake or starter system of such vehicle and driven continuously at high speeds.

While I prefer to use the leaf valves interchangeable for inlet and discharge, in some instances where considerable oil pumping occurs in the compressor and the oil leaks by the piston, I may not use the leaf spring for the discharge valve.

I desire it to be understood that this invention is not to be limited to any specific form or arrangement of parts except insofar as such limitations are specified in the claims.

What I claim as my invention is:

1. In a compressor, the combination of a seat member having a ported recess and end recesses communicating therewith and a guard recess, a valve of thin sheet spring steel seating in said ported recess and said end recesses, and of less width than said ported recess, an inclined guard of less width than said ported recess seated at one end in one of said end recesses and at its other end in said guard recess, and means for securing one end of said valve and the registering end of said guard to said seat member.

2. In a compressor, a cylinder head having a flat-bottomed recess above the cylinder face with inlet openings communicating with said recess, a spring leaf inlet valve and its guard associated with said recess and controlling the passage of fluid to the cylinder, said cylinder head having a discharge opening, a valve cage seated in said head and having a bore communicating with said discharge opening and lateral openings, a spring leaf discharge valve and its guard associated with said lateral openings at substantially right angles to the closed end of the compressor cylinder and controlling the discharge of pressure fluid from the cylinder.

3. In a compressor, a discharge valve unit comprising a cage having a bore in one end and lateral openings leading therefrom and communicating with a slot forming a seat, a spring leaf valve secured at one end to said cage and seating on the bottom of said slot, and a guard secured to the same end of said cage and disposed in said recess.

4. In a compressor, the combination with the cylinder and its head, a discharge valve unit comprising a cage having a bore in one end opening into the cylinder and lateral openings leading therefrom and communicating with a slot forming a seat, said cage having threaded engagement with the cylinder head, means for sealing the upper and lower ends of said cage against leakage, said cylinder head having a discharge port intermediate the ends of said cage with which said lateral openings communicate, and a spring leaf valve and a guard associated with the slotted portion of said cage and controlling the passage of pressure fluid through said lateral openings.

5. In a compressor, the combination with the cylinder and its head, of a discharge valve unit comprising a cage having a bore in one end opening into the cylinder and lateral openings leading therefrom and communicating with a slot forming a seat, said cage having threaded engagement with the cylinder head and sealing engagement at its open end with said head, a cap-nut in sealing engagement with the cylinder head and in threaded engagement with said cage, said cylinder head having a discharge port intermediate the ends of said cage with which said lateral openings communicate, and a spring leaf valve and a guard associated with the slotted portion of said cage and controlling the passage of pressure fluid through said lateral openings.

6. In a compressor, interchangeable inlet and discharge valves, each including a valve of thin sheet spring steel, means for mounting the inlet valve substantially flatwise of the closed end of the compressor cylinder, and means for mounting the discharge valve at substantially right angles to the closed end of the compressor cylinder.

7. In a compressor, the combination with the cylinder and a detachable cylinder head having a ported recess, of a spring leaf valve seating over the bottom of said recess, and a guard for said valve disposed adjacent the bottom of the cylinder head, means for securing one end of the valve and its guard to the cylinder head, said guard overlapping the bore at the ends of the guard and at the securing means to prevent these parts getting into the cylinder.

8. In a compressor, the combination of a seat member having a ported recess and a stop recess, a valve of thin sheet spring metal having a fastening opening at one end, and a guard having a fastening opening at one end to register with the fastening opening of said valve and inclining therefrom to its other end which projects beyond the free end of the valve to positively limit its movement and is seated in said stop recess, and means passing through said fastening openings to assemble said valve and guard relative to the ports of said seat member.

9. In a compressor, the combination of a cylindrical cage having detachable connection with the compressor, and provided with an axial bore in one end and a lateral opening leading therefrom and a lengthwise-extending slot forming a seat adjacent said opening, and a spring plate valve and its guard associated with said seat.

In testimony whereof, I affix my signature.

NIELS A. CHRISTENSEN.